Patented Nov. 18, 1924.

1,516,376

UNITED STATES PATENT OFFICE.

GUILLAUME DE MONTMOLLIN AND GÉRALD BONHÔTE, OF BASEL, SWITZERLAND, ASSIGNORS TO SOCIETY OF CHEMICAL INDUSTRY IN BASLE, OF BASEL, SWITZERLAND.

ARYLHYDROXYNAPHTHYLKETONE AND PROCESS OF MAKING SAME.

No Drawing.   Application filed July 17, 1922. Serial No. 575,579.

*To all whom it may concern:*

Be it known that we, GUILLAUME DE MONTMOLLIN and GÉRALD BONHÔTE, both citizens of the Swiss Republic, and residents of Basel, Switzerland, have invented new and useful Arylhydroxynaphthylketones and Processes of Making Same, of which the following is a full, clear, and exact specification.

We have found that by acting, in absence of substances capable of neutralizing acids, on betanaphthol and on monohydroxynaphthalenes which bear further negative substituents other than OH-groups with bodies corresponding to the formula R—C≡Cl$_3$, wherein R stands for an aromatic nucleus, which may bear other substituents, as for instance phenylchloroform, its substitution products, and naphthylchloroforms, there are obtained new arylmonohydroxynaphthylketones. These latter correspond to the general formula R—CO—R′, wherein R stands for an aromatic nucleus which may bear other substituents and R′ for a hydroxynaphthalene nucleus which may also bear other negative substituents excepting OH-groups. These new products constitute colorless or slightly colored powders soluble in alkalies with a yellow coloration and in concentrated sulfuric acid with a yellow-brown coloration. They are very interesting for the manufacture of dyestuffs.

*Example 1.*

188 parts of 1-hydroxynaphthalene-2-carboxylic acid are introduced into 230 parts of phenylchloroform and the solution thus obtained is heated to about 100–120° C., until the evolution of hydrochloric acid ceases. The excess of phenyl-chloroform is distilled off in vacuo. The residue is boiled for some time with dilute caustic soda solution, the solution thus obtained is filtered, then treated with an excess of acid which precipitates the 1-phenylketone-4-hydroxynaphthalene-3-carboxylic acid. Crystallized from dilute acetic acid the new ketone melts at 205° C., it dissolves in alkalies and in concentrated sulfuric acid to yellow solutions. By eliminating or splitting off the carboxylic group, there is obtained the 1-phenyl-4-hydroxynaphthylketone described by Scholl and Seer in "Liebig's Annalen" No. 394, page 151.

*Example 2.*

19.5 parts of phenylchloroform and 18.8 parts of 1-hydroxynaphthalene-2-carboxylic acid are introduced into 100 parts of sulfuric acid and the whole is stirred at ordinary temperature until the evolution of hydrochloric acid ceases. Then the whose mass is poured into water and the precipitated 1-phenylketone-4-hydroxynaphthalene-3-carboxylic acid is filtered off.

In analogous manner there are obtained by starting from 1-hydroxynaphthalene-2-carboxylic acid and from orthochlorophenylchloroform or from 1-chloro-2-naphthylchloroform, the 1-(2-chlorophenyl-)-ketone-4-hydroxynaphthalene-3-carboxylic acid melting at 213° C. or the 1-chloro-2:1′-dinaphthylketone-4′-hydroxy-3′-carboxylic acid melting at 210–211° C., by starting from betanaphthol and from phenylchloroform the 1-phenylketone-2-hydroxynaphthalene melting at 175°, by starting from 2-hydroxynaphthalene-3-carboxylic acid and from phenylchloroform the 1-phenylketone-2-hydroxynaphthalene-3-carboxylic acid and by starting from phenylchloroform and from 1-chloro-8-hydroxynaphthalene the 1-phenylketone-4-hydroxy-5-chloronaphthalene melting at 121° C.

The sulfonic acids of the naphthols react in the same manner. There can for instance be obtained by starting from 1-hydroxynaphthalene-2-sulfonic acid the 1-phenylketone-4-hydroxynaphthalene-3-sulfonic acid, by starting from 1-hydroxynaphthalene-8-sulfonic acid the 1-phenylketone-4-hydroxynaphthalene-5-sulfonic acid; the 1-hydroxynaphthalene-4-sulfonic acid and the 1-hydroxynaphthalene-5-sulfonic acid give the 2-phenylketone-1-hydroxynaphthalene-4-sulfonic acid and the 2-phenylketone-1-hydroxynaphthalene-5-sulfonic acid and the 2-hydroxynaphthalene-6-sulfonic acid gives the 1-phenylketone-2-hydroxynaphthalene-6-sulfonic acid.

All these ketones are more or less white powders; they dissolve in alkalies with yellow coloration and in concentrated sulfuric acid with a more or less brown yellow coloration.

As it may be the case, the quantity of sulfuric acid serving as reaction medium will be reduced or increased; the sulfuric acid can also be replaced more or less completely by an indifferent liquid as for instance nitrobenzene.

What we claim is:

1. The herein described process for the manufacture of arylmonohydroxynaphthylketones corresponding to the general formula R—CO—R', wherein R stands for an aromatic nucleus, which may bear other substituents with the exception of a carboxyl group, and R' for a hydroxynaphthalene nucleus which still bears negative substituents other than hydroxyl groups, consisting in acting, in absence of substances capable of neutralizing acids, on monohydroxynaphthalenes which bear further negative substituents other than OH-groups with arylchloroforms.

2. The herein described process for the manufacture of arylmonohydroxynaphthylketones corresponding to the general formula R—CO—R', wherein R stands for an aromatic nucleus, which may bear other negative substituents with the exception of a carboxyl group and R' for an alphahydroxynaphthalene nucleus, which still bears negative substituents other than hydroxyl groups, consisting in acting in absence of substances capable of neutralizing acids on derivatives of alphanaphthol bearing negative substituents, exception being made for the OH-group, with arylchloroforms.

3. The herein described process for the manufacture of arylmonohydroxynaphthylketones of the general formula R—CO—R', wherein R stands for an aromatic nucleus which may bear other substituents with the exception of a carboxyl group and R' for an alphahydroxynaphthalene nucleus bearing a negative substituent other than OH-groups in the 3 position, consisting in acting, in absence of substances capable of neutralizing acids, on alphanaphtholderivatives negatively substituted in their 2 position with other substituents than with OH-groups, with arylchloroforms.

4. The herein described process for the manufacture of arylmonohydroxynaphthylketones of the general formula R—CO—R', wherein R stands for an aromatic nucleus which may bear other substituents with the exception of a carboxyl group, and R' for an alphahydroxynaphthalene nucleus bearing a carboxyl group in the 3 position, consisting in acting, in the absence of substances capable of neutralizing acids, on 1-hydroxynaphthalene-2-carboxylic acid with arylchloroforms.

5. The herein described process for the manufacture of arylmonohydroxynaphthylketones of the general formula R—CO—R', wherein R stands for a benzene nucleus, which may bear other substituents with the exception of a carboxyl group, and R' for an alphahydroxynaphthalene nucleus bearing a carboxyl group in the 3 position, consisting in acting, in the absence of substances capable of neutralizing acids, on 1-hydroxynaphthalene-2-carboxylic acid with arylchloroforms.

6. The herein described process for the manufacture of 1-phenylketone-4-hydroxynaphthalene-3-carboxylic acid consisting in acting with phenylchloroform, on 1-hydroxynaphthalene-2-carboxylic acid, in absence of substances capable of neutralizing acids.

7. As new products the herein described arylmonohydroxynaphthylketones corresponding to the general formula R—CO—R', wherein R stands for an aromatic nucleus which may bear with the exception of a carboxyl group other substituents and R' for a hydroxynaphthalene nucleus which still bears negative substituents other than OH-groups, the said arylmonohydroxynaphthylketones being colorless or slightly colored powders, soluble in alkalies and concentrated sulfuric acid with a more or less brownish yellow coloration.

8. As new products the herein described arylmonohydroxynaphthylketones corresponding to the general formula R—CO—R', wherein R stands for an aromatic nucleus which may bear with the exception of a carboxyl group other substituents and R' for an alphahydroxynaphthalene nucleus bearing beside the OH-group already present other negative substituents, the said arylmonohydroxynaphthylketones being colorless or slightly colored powders, soluble in alkalies and concentrated sulfuric acid with a more or less brownish yellow coloration.

9. As new products the herein described arylmonohydroxynaphthylketones corresponding to the general formula R—CO—R', wherein R stands for an aromatic nucleus which may bear with the exception of a carboxyl group other substituents and R' for an alphahydroxynaphthalene nucleus bearing beside the OH-group already present another negative substituent in the 3 position, the said arylmonohydroxynaphthylketones being colorless or slightly colored powders, soluble in alkalies and concentrated sulfuric acid with more or less brownish yellow coloration.

10. As new products the herein described arylmonohydroxynaphthylketones corresponding to the general formula R—CO—R', wherein R stands for an aromatic nucleus which may bear with the exception of a carboxyl group other substituents and R' for an alphahydroxynaphthalene nucleus bearing a carboxyl group in the 3 position, the said arylmonohydroxynaphthylketones being colorless or slightly colored powders, soluble in alkalies and concentrated sulfuric acid with a more or less brownish yellow coloration.

11. As new products the herein described arylmonohydroxynaphthaleneketones corresponding to the formula R—CO—R', wherein R stands for a benzene nucleus which may bear with the exception of a carboxyl group other substituents and R' for a hydroxynaphthalene nucleus bearing a carboxyl group in the 3 position, the said arylmonohydroxynaphthaleneketones being colorless or slightly colored powders, soluble in alkalies and concentrated sulfuric acid with a more or less brownish yellow coloration.

12. As a new article of manufacture the herein described 1-phenylketone-4-hydroxynaphthalene-3-carboxylic acid corresponding to the formula

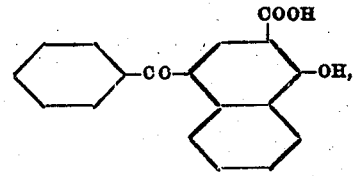

melting at 205° C. and constituting a colorless powder soluble in alkalies and sulfuric acid to yellow solutions.

In witness whereof we have hereunto signed our names this 5th day of July, 1922, in the presence of two subscribing witnesses.

GUILLAUME DE MONTMOLLIN.
GERALD BONHÔTE.

Witnesses:
AMAND BRAME,
J. A. DÜRST.